J. S. CUNNINGHAM.
CLUTCH PEDAL LOCK.
APPLICATION FILED SEPT. 23, 1919.
1,347,252.
Patented July 20, 1920.
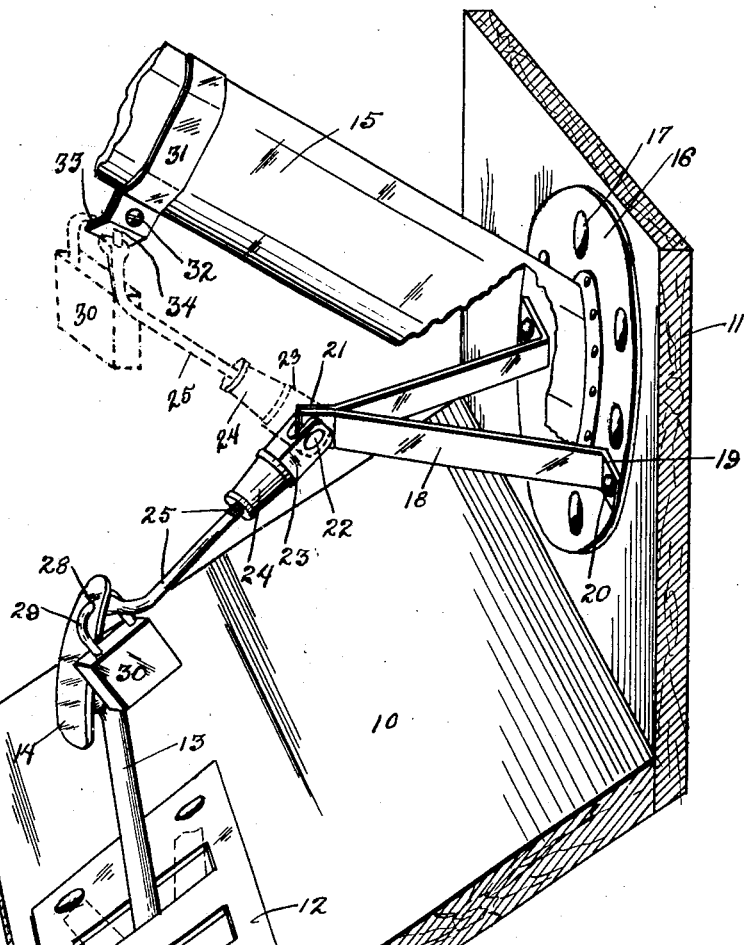
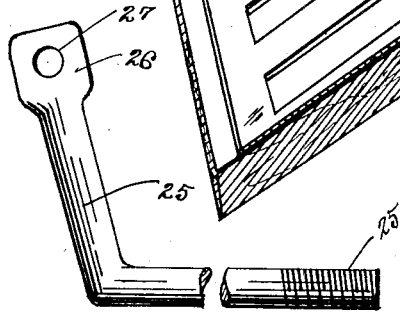
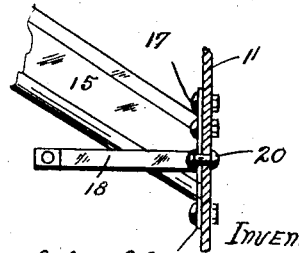
Witness
J. Weber
Inventor
John S. Cunningham
By Orwig & Bair ATTY'S

UNITED STATES PATENT OFFICE.

JOHN S. CUNNINGHAM, OF DES MOINES, IOWA.

CLUTCH-PEDAL LOCK.

1,347,252.　　　　　Specification of Letters Patent.　　Patented July 20, 1920.

Application filed September 23, 1919. Serial No. 325,774.

*To all whom it may concern:*

Be it known that I, JOHN S. CUNNINGHAM, a citizen of the United States, and a resident of Des Moines, in the county of Polk and State of Iowa, have invented a certain new and useful Clutch-Pedal Lock, of which the following is a specification.

The object of my invention is to provide a clutch pedal lock of simple, durable and inexpensive construction.

A further object of my invention is to provide a clutch pedal lock, which is especially designed to hold the clutch pedal of an automobile in neutral position, so that the clutch will be disengaged when the lock is in place to hold it from movement.

A further object of my invention is to provide a clutch pedal lock, which may be attached to an automobile of well-known make, which has a clutch pedal which at its rear position causes the automobile to travel on high gear; at its central position disconnects the engine from the transmission; and at its forward position causes the automobile to travel on the intermediate or lower gear. My lock is designed to be moved to position to lock the pedal in position where the clutch is in in-operative or neutral position and when not in use to be swung up to position adjacent to the steering column of the machine, where it will not interfere with the free operation of the pedal.

A further object of my invention is to provide a supporting bracket for my locking device, which makes it possible to secure it to the steering column flange on the dash without special tools and to provide a locking arm of adjustable length, whereby the engagement of the locking arm with the pedal may be regulated to cause the pedal to be held exactly in the desired position.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a perspective view of the footboard, dash, steering column, and pedal of an automobile, having mounted thereon my improved pedal lock.

Fig. 2 shows a top or plan view of my locking arm; and

Fig. 3 shows a side elevation of the steering column and my improved bracket, the dash and a portion of the steering column base being shown in section to better illustrate the construction.

Referring to the accompanying drawings, I have used the reference numeral 10 to indicate generally the footboard of an automobile at the upper edge of which is the dashboard 11. Secured to the footboard 10 is a pedal plate 12 having spaced, parallel slots therein designed to receive the pedals of the machine and to permit their swinging movement.

The clutch pedal 13 is the only one illustrated in this drawing, in order to more clearly illustrate my invention, and consists of the shank 13 having at its upper end a plate 14 upon which the operator's foot rests.

Extending upwardly and rearwardly from the dashboard 11 is the steering column 15, which is secured to the dashboard 11 by the flange 16 having a plurality of bolts 17 extending through the end of the dash. The supporting bracket for my improved lock comprises strips of strap iron 18, which have one end bent at an angle to form feet 19 having openings therein designed to receive rivets 20, whereby the bracket members 18 may be secured to the steering column flange without defacing the dashboard or footboard.

The other ends of the strips 18 are bent at 21, so that they form parallel contiguous ears having alined openings therein, designed to receive a pin 22. The portions 18 of the strips are inclined toward each other, so that the lower portions of the steering column 15 may extend between the diverging ends of the strips, thereby permitting the bracket to occupy a minimum amount of space and at the same time form a rigid support for my locking bar.

The latter consists of a clevis 23 having openings therein designed to pivotally receive the pin 22, and a shank 24 having a screw-threaded opening therein designed to receive the threaded locking bar 25. The free end of the locking bar 25 is flattened at 26 and bent, so that when the clutch pedal 13 is in the neutral position, the upper surfaces of the flattened portion 26 may be contiguous to the lower surfaces of the pedal portion 14.

An opening 27 is formed in the flattened portion 26 and an opening 28 is formed in the pedal portion 14. These openings are designed when alined to receive the shackle 29 of a padlock 30.

From the construction of the parts just described, it will be seen that in order to install the parts of my improved device, opposite bolts 17 should be removed from the steering column 16 and dashboard 11, and the feet 19 of my bracket members secured to the steering column flange by means of rivets 20. An opening may then be drilled in the pedal member 14 of sufficient size to receive a shackle of a padlock. The clutch member is then moved to neutral position and the locking bar 25 may be screwed into and out of the shank 24 until the opening 27 registers with the opening 28.

When this has been done, it will be seen that inserting the shackle 29 in the openings 27 and 28 will exactly lock the clutch pedal in neutral position, thereby making it impossible to throw the car into low or high gear.

When it is desired to render the locking device inoperative, it is swung to position where the locking bar 25 is adjacent to the steering column 15, in which position it may be held by the following means. A bar of resilient material 31 is extended around the steering column and clamped in position by means of a bolt 32. The ends of the strap 31 are bent at right angles to the portion holding the bolt 32 at 33 and an opening formed therein at 34, which is so arranged that when the locking bar is swung to the position indicated by the dotted lines in Fig. 1, then the shackle of the padlock may be readily inserted through the opening 27 and the opening 34 to hold the locking bar in position adjacent to and parallel with the steering column, so that it will not interfere with the free operation of the driver's foot when he moves the clutch pedal 13.

An advantage of my improved structure resides in the fact that it is only necessary to bore a hole in the clutch pedal and to substitute the rivets 20 for the bolts 17 in order to install the device on the automobile. It will therefore be seen that the automobile is not in the least defaced.

The locking bar is where it will not absolutely interfere with the movement of the driver's foot when he is operating the pedal.

When my improved device is used, the car may be pushed about by hand without undue effort and the motor may even be started if necessary. It is, however, impossible to throw the car into gear, so that it can be driven, thereby permitting necessary emergency movements of the car, while prohibiting illicit driving of the car.

In order to tamper with this lock, a thief must cut through the pedal shank, the shackle, the locking bar, the bracket straps 18 or the rivets 20. Cutting through a lock is, however, sufficient to sufficiently delay or deter a thief to protect the car under all ordinary circumstances, and my construction especially as to the bracket members 18, is such that the parts are inaccessible for convenient manipulation, unless the padlock 30 is removed.

Some changes may be made in the construction and arrangement of my improved device without departing from the real purpose and spirit of my invention, and it is my intention to cover by my claims any modified forms of structure or use of mechanical equivalents, which may be reasonably included within their scope.

I claim as my invention:

1. In a device of the class described adapted to be mounted on an automobile having an inclined footboard, a pedal adapted to reciprocate within a slot within the footboard, said pedal having an opening therein, a dashboard, a steering column secured to and extended upwardly and rearwardly from the dashboard adjacent to the pedal, said steering column having an outwardly extending flange with openings therein whereby it may be secured to the dashboard, a bracket comprising diverging arms having a foot formed at either end, means for securing said foot to the steering column flange at either side thereof, a pin extended through the rear end of said bracket, a clevis pivotally mounted on said pin, a shank formed integral with said clevis having a central threaded opening therein, a locking bar having one end threaded to enter and coact with the opening in the shank, an opening in the other end of the locking bar and a shackle adapted to extend through the opening in the locking bar and in the clutch pedal.

2. In a device of the class described adapted to be mounted on an automobile having an inclined footboard, a pedal adapted to reciprocate within a slot within the footboard, said pedal having an opening therein, a dashboard, a steering column secured to and inclined upwardly and rearwardly from the dashboard adjacent to the pedal, said steering column having an outwardly extending flange with openings therein, whereby it may be secured to the dashboard, a bracket comprising diverging arms having a foot formed at either end, means for securing said feet to the steering column flange at either side thereof, a pin extended through the rear end of said bracket, a clevis pivotally mounted on said pin, a shank formed integral with said clevis having a central threaded opening therein, a locking bar having one end threaded to enter and coact with the opening in the shank, and an opening in the other end, a shackle adapted to extend through the opening in the locking bar and in the clutch pedal, a band of resilient material extended around the steering column having alined openings in its ends, a bolt extended through said openings whereby said band may be secured in a plurality of positions relative to the steering column and a second pair of openings in said band adapted to receive the shackle when the locking bar is in in-operative position.

3. In a device of the class described, adapted to be mounted on an automobile having an inclined footboard, a pedal adapted to reciprocate within a slot within the footboard, said pedal having an opening therein, a dashboard, a steering column secured to and inclined upwardly and rearwardly from the dashboard adjacent to the pedal, said steering column having an outwardly extending flange with openings therein, whereby it may be secured to the dashboard, a bracket comprising diverging arms having feet at their forward ends, means for securing said feet to the steering column flange, a locking bar pivotally mounted at the rear end of said bracket, means for adjusting the length of said locking bar, a holding device mounted on the steering column, means for moving said holding device to a plurality of adjusted positions and a locking device adapted to coact with the locking bar, and selectively with both the pedal and holding device, whereby the length of the locking bar may be adjusted to accurately position the pedal when locked in a pre-determined place, and the holding device may be moved to position around the steering column to correspond with the length of the locking bar.

Des Moines, Iowa, September 16, 1919.

JOHN S. CUNNINGHAM.